(12) United States Patent
Truong et al.

(10) Patent No.: US 10,901,193 B2
(45) Date of Patent: Jan. 26, 2021

(54) OPTIMIZED VOLUMETRIC IMAGING WITH SELECTIVE VOLUME ILLUMINATION AND LIGHT FIELD DETECTION

(71) Applicant: University of Southern California, Los Angeles, CA (US)

(72) Inventors: Thai V. Truong, Pasadena, CA (US); Sara Madaan, Valley Village, CA (US); Daniel B. Holland, Pasadena, CA (US); Scott E. Fraser, Glendale, CA (US)

(73) Assignee: University of Southern California, Los Angeles, CA (US)

( * ) Notice: Subject to any disclaimer, the term of this patent is extended or adjusted under 35 U.S.C. 154(b) by 78 days.

(21) Appl. No.: 16/079,979

(22) PCT Filed: Feb. 24, 2017

(86) PCT No.: PCT/US2017/019512
§ 371 (c)(1),
(2) Date: Aug. 24, 2018

(87) PCT Pub. No.: WO2017/147528
PCT Pub. Date: Aug. 31, 2017

(65) Prior Publication Data
US 2019/0064493 A1    Feb. 28, 2019

Related U.S. Application Data

(60) Provisional application No. 62/300,469, filed on Feb. 26, 2016.

(51) Int. Cl.
*G02B 21/00*    (2006.01)
*G02B 21/36*    (2006.01)
(Continued)

(52) U.S. Cl.
CPC ..... *G02B 21/0032* (2013.01); *G02B 21/0028* (2013.01); *G02B 21/0076* (2013.01);
(Continued)

(58) Field of Classification Search
None
See application file for complete search history.

(56) References Cited

U.S. PATENT DOCUMENTS 4,421,317 A * 12/1983 Hector ............... A63F 13/08
463/32
5,713,364 A * 2/1998 DeBaryshe ........ A61B 1/00059
250/461.2

(Continued)

OTHER PUBLICATIONS

European Patent Application No. 17757380.5, Extended European Search Report, dated Feb. 21, 2019, 10 pages.
(Continued)

*Primary Examiner* — Tyler W. Sullivan
(74) *Attorney, Agent, or Firm* — Fish & Richardson P.C.

(57) ABSTRACT

Volumetric imaging with selective volume illumination (SVI) using light field detection is provided using various systems and techniques. A volumetric imaging apparatus includes a light source configured to emit an illumination light that propagates via an illumination light path to illuminate a three-dimensional (3D) sample; and an optical system arranged with respect to the light source to receive a light field, which comes from the illuminated 3D sample. The light field propagates via a detection light path, and the light source, the optical system, or both; are configurable to perform SVI, which selects a volume of a 3D-confined illumination of the 3D sample based on the 3D sample to be illuminated and a light field detection (LFD) process to be applied. Further, the volume of the 3D-confined illumination is a selected 3D volume of the 3D sample to be particularly excited by the 3D-confined illumination for imaging.

21 Claims, 9 Drawing Sheets

(51) Int. Cl.
 *H04N 19/597* (2014.01)
 *H04N 13/254* (2018.01)
 *H04N 13/111* (2018.01)

(52) U.S. Cl.
 CPC ....... *G02B 21/0088* (2013.01); *G02B 21/367* (2013.01); *H04N 13/111* (2018.05); *H04N 13/254* (2018.05); *H04N 19/597* (2014.11)

(56) References Cited

U.S. PATENT DOCUMENTS

| | | | | |
|---|---|---|---|---|
| 5,813,987 | A * | 9/1998 | Modell | A61B 5/0062 250/216 |
| 9,955,863 | B2 * | 5/2018 | Frisken | A61B 3/102 |
| 10,690,898 | B2 * | 6/2020 | Atzler | G02B 21/16 |
| 2002/0135673 | A1 | 9/2002 | Favalora et al. | |
| 2003/0035109 | A1 | 2/2003 | Hartwich et al. | |
| 2003/0170173 | A1 | 9/2003 | Klaveness et al. | |
| 2004/0207839 | A1 * | 10/2004 | Gerstner | G01N 21/896 356/239.1 |
| 2007/0213618 | A1 | 9/2007 | Li et al. | |
| 2008/0266655 | A1 | 10/2008 | Levoy et al. | |
| 2009/0041316 | A1 * | 2/2009 | Koos | G06K 9/00134 382/128 |
| 2009/0225409 | A1 | 9/2009 | Ilev et al. | |
| 2010/0252750 | A1 * | 10/2010 | Xie | G02B 21/16 250/459.1 |
| 2012/0022360 | A1 * | 1/2012 | Kemp | A61B 5/417 600/410 |
| 2012/0104281 | A1 * | 5/2012 | Andersson-Engels | G01N 21/6456 250/459.1 |
| 2012/0200829 | A1 | 8/2012 | Bronstein et al. | |
| 2013/0107275 | A1 * | 5/2013 | Boccara | G01B 11/2441 356/479 |
| 2014/0246612 | A1 * | 9/2014 | Spiecker | G01J 1/42 250/578.1 |
| 2015/0201176 | A1 | 7/2015 | Graziosi et al. | |
| 2015/0247999 | A1 * | 9/2015 | Ntziachristos | G01N 21/1702 348/80 |
| 2015/0339824 | A1 * | 11/2015 | Uliyar | G06T 7/514 348/46 |
| 2015/0381908 | A1 | 12/2015 | DeBruijn et al. | |
| 2016/0327779 | A1 * | 11/2016 | Hillman | G02B 23/04 |
| 2016/0349046 | A1 * | 12/2016 | Tin | G06T 7/55 |
| 2017/0068080 | A1 | 3/2017 | Anhut et al. | |
| 2017/0205615 | A1 * | 7/2017 | Vaziri | G02B 21/367 |
| 2017/0343695 | A1 * | 11/2017 | Stetson | G01R 33/032 |
| 2018/0251833 | A1 * | 9/2018 | Daugharthy | C12Q 1/6869 |
| 2019/0226989 | A1 * | 7/2019 | Karpf | H01S 3/06758 |

OTHER PUBLICATIONS

Cohen et al., "Enhancing the performance of the light field microscope using wavefront coding", Optics Express, vol. 22, No. 20, Oct. 3, 2014, pp. 24817-24839.

Jason Geng, "Structured-light 3D surface imaging: a tutorial", Advances in Optics and Photonics 3, 128-160 (2011), pp. 128-160.

Broxton et al., "Wave optics theory and 3-D deconvolution for the light field microscope", Optics Express vol. 21, No. 21, Oct. 21, 2013, pp. 25418-25439.

International Search Report/Written Opinion issued by the USPTO dated May 10, 2017, 14 pages.

* cited by examiner

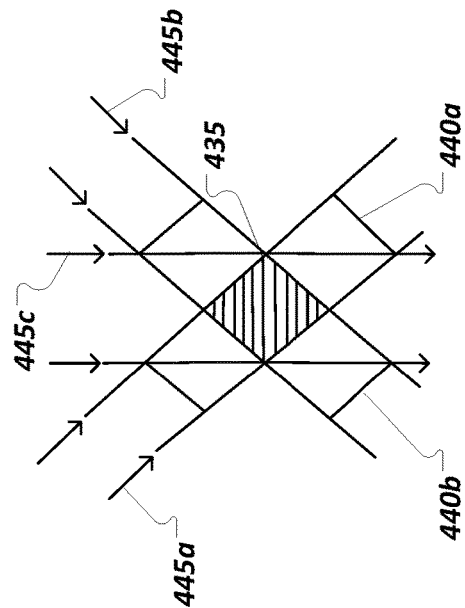
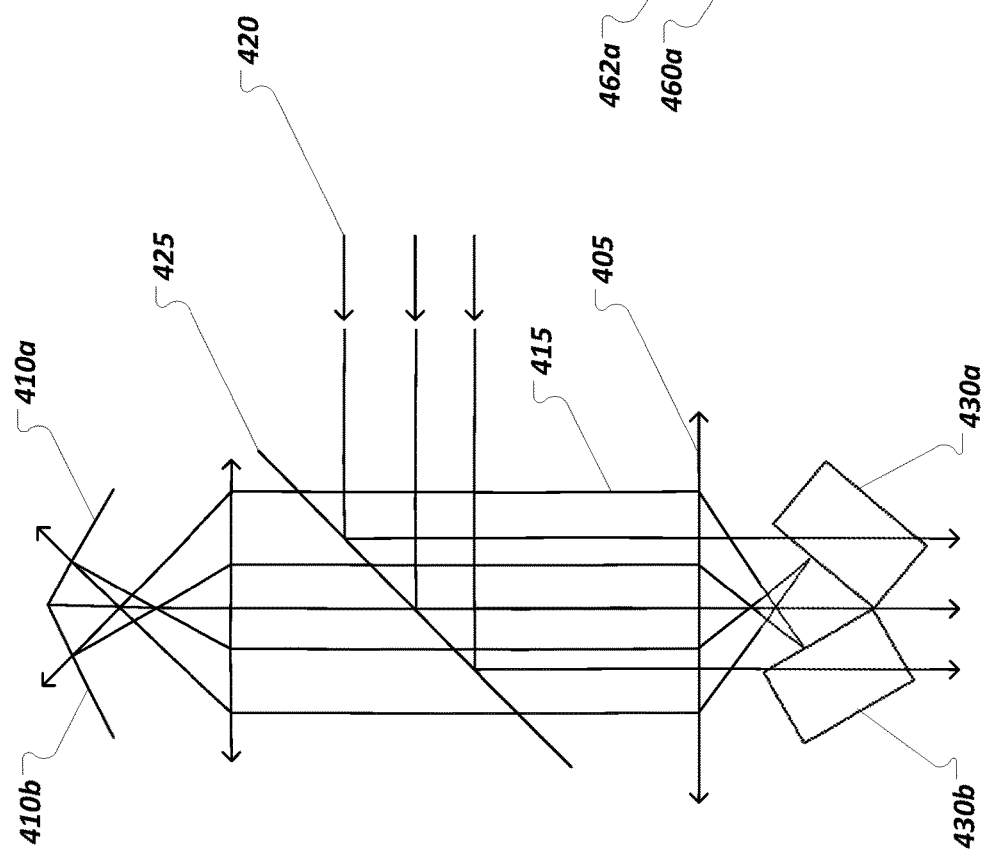
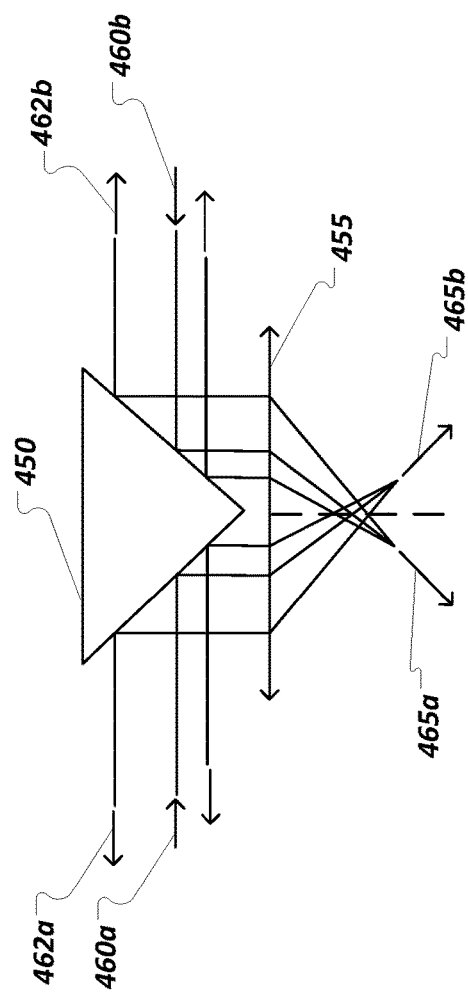
FIG. 4B
FIG. 4C
FIG. 4A

US 10,901,193 B2

OPTIMIZED VOLUMETRIC IMAGING WITH SELECTIVE VOLUME ILLUMINATION AND LIGHT FIELD DETECTION

CROSS REFERENCE TO RELATED APPLICATIONS

This application is a National Stage Application under 35 U.S.C. § 371 and claims the benefit of International Application No. PCT/US2017/019512, filed Feb. 24, 2017 that claims priority to U.S. Provisional Application No. 62/300,469 filed Feb. 26, 2016. The disclosure of the foregoing applications are hereby incorporated by reference in their entirety.

BACKGROUND

This specification relates to optimizing volumetric imaging using light field detection with biomolecule imaging systems, such as microscopy platforms.

Various biological processes can depend on the tight spatial-temporal coordination between cells across tissue-scale three-dimensional (3D) space. Hence, there exists a need for volumetric imaging tools that could image at cellular resolution, provide 3D-sectioning, and at speeds fast enough to faithfully capture dynamic processes. In some instances, the need for biological volumetric imaging is met with scanning approaches: optical signal is collected one point, line, or plane at a time, then the excitation region is scanned in 3D, 2D, or 1D, respectively, to cover the entire 3D region of interest of the sample. Due to the sequential nature of the scanning process, data acquisition speed can be slow. Also, because of the sequential scanning, information of different parts of the 3D sample is collected at different times, hence the dynamic information might be lost or distorted. Thus, a need exists for a synchronous volumetric live imaging modality, where a single snapshot can capture spatial information over a tissue-scale axially-extended volume, while maintaining single- or few-cell resolution.

An existing imaging modality that can provide synchronous volumetric imaging capability is light field microscopy (LFM). However, LFM techniques use wide-field illumination, essentially lighting up the entirety of the sample, even though only a part of the sample is meaningfully captured in the reconstruction. Thus, wide-field illumination introduces extraneous background and noise, potentially degrading the contrast and accuracy of the final reconstructed images.

SUMMARY

This specification relates to systems and techniques for optimizing volumetric imaging using selective volume illumination (SVI) with light field detection utilized in biomedical imaging systems, such as microscopy platforms.

In general, one or more aspects of the subject matter described in this specification can be embodied in one or more systems that include: a light source configured to emit an illumination light that propagates via an illumination light path to illuminate a three-dimensional (3D) sample; and an optical system arranged with respect to the light source to receive a light field, which comes from the illuminated 3D sample, wherein the light field propagates via a detection light path; wherein the light source, the optical system, or both, are configurable to select a volume of a 3D-confined illumination of the 3D sample based on the 3D sample to be illuminated and a light field detection (LFD) process to be applied.

Particular embodiments of the subject matter described in this specification can be implemented to realize one or more of the following advantages. The systems and techniques described can realize advantages associated with providing SVI where only the relevant part of the 3D sample is illuminated, thus significantly reducing the background signal and providing higher contrast and accuracy for the light field image reconstruction. The techniques disclosed implement a scanned-optical-volume SVI that provides down to micron-level precision in defining the SVI. A static-optical-volume SVI reduces the probability of photo-induced damage to the biological sample during imaging.

The techniques and systems disclosed implement selective volume illumination light field detection (SVI-LFD) imaging capabilities within the structure of a conventional microscopy platform, using the same configuration, with the same sample under study, to record a high resolution, optically-sectioned 3D image (using the conventional microscopy mode), in addition to the light-field-reconstructed volumetric image. SVI approaches can improve the speed and accuracy of the computational reconstruction that is used in light field imaging. The SVI techniques utilize smaller, more constrained excitation volumes, allowing for a computational reconstruction that is faster, less noisy and more robust. A multi-view light field detection (LFD) imaging technique is implemented which realizes enhanced resolution of a final volumetric image by combining image data captured from imaging the sample from multiple directions.

The details of one or more embodiments of the subject matter described in this specification are set forth in the accompanying drawings and the description below. Other features, aspects, and advantages of the invention will become apparent from the description, the drawings, and the claims.

DRAWING DESCRIPTIONS

FIGS. 4A-4C show examples of optical geometries for use with an implementation of SVI using multi-view LFD imaging techniques.

Like reference numbers and designations in the various drawings indicate like elements.

DETAILED DESCRIPTION

Figure 1:
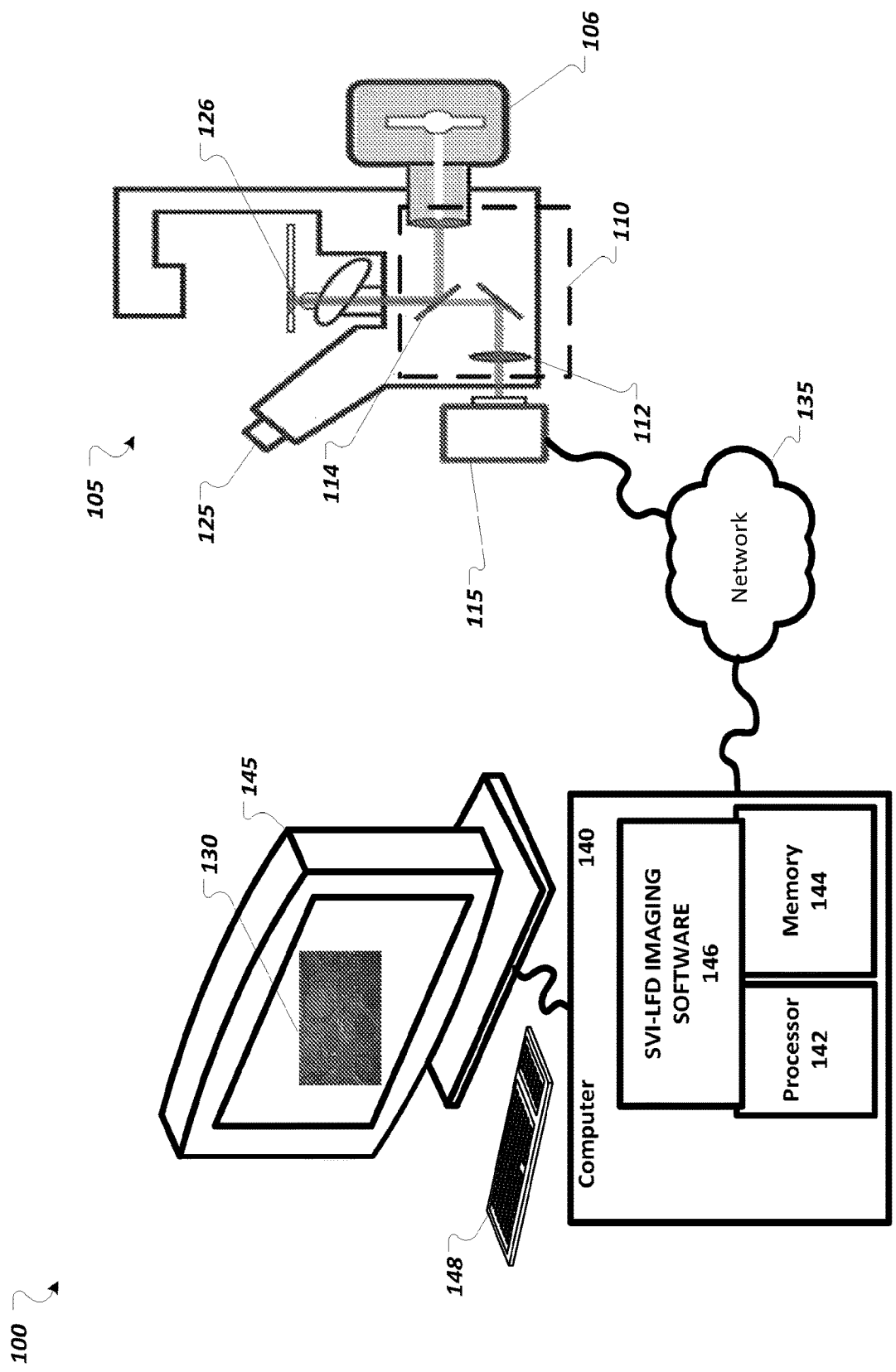
FIG. 1 shows an example of a volumetric imaging system employed to provide selective volume illumination (SVI) using light field detection.

FIG. 1 shows an example of a volumetric imaging system 100 employed to provide selective volume illumination (SVI) using light field detection. For example, the volumetric imaging system 100 provides light field capabilities such as supporting 3D reconstruction of a microscopic sample 126. According to the embodiments, the volumetric imaging system 100 can be employed to provide 3D imaging at cellular or better resolution, and 3D sectioning, at speeds that can capture dynamic processes (e.g., low-resolution/high-speed volumetric). As illustrated in FIG. 1, the system integrates various hardware, software, and firmware components that operate in concert to accomplish the selective volume illumination techniques of the embodiments, so as to illuminate a 3D-confined illumination of sample 126, which is a particular portion of the 3D sample that has been determined to be substantially relevant to volumetric imaging. That is, the 3D-confined illumination is a selected volume of the 3D sample 126 to be particularly excited by an illumination light for imaging.

The volumetric imaging system 100 is shown in FIG. 1 to include: a volumetric imaging apparatus 105; a LFD mechanism 115; a network 135; and a computer 140. The volumetric imaging apparatus 105 includes various components of the system 100 arranged to emit light for illuminating a volume of the 3D sample 126 to be imaged. In some embodiments, the volumetric imaging system 100 is implemented to provide light field imaging of contrast-enhanced agents. For example, photo-chemico-physical properties of contrast agents in the sample 126 can be changed by exposure to an illumination light, rendering enhanced contrast in a 3D selective volume of the sample 126. Once the properties of the contrast agents have been changed in a selective volume, high-contrast LFD imaging of said volume can be achieved even with conventional wide-field illumination. The contrast agents can include: photo-activated or photo-convertible fluorescent proteins, or photo-activated or photo-convertible synthetic particles such as, but not limited to, nanoparticles or quantum dots.

As illustrated, the volumetric imaging apparatus 105 includes: a light source 106; an optical system 110; and a microscope assembly 125. The optical system 110 includes one or more optical elements arranged for adjusting the optical geometry of the apparatus 105 to provide optical paths to the 3D sample 126 and to the detection mechanism 115. As an example, the optical system 110 is shown as including various optical elements, such as one or more lenses 112, and mirrors 114. However, various components of the optical system 110 can be changed, or otherwise configured, as deemed necessary and/or appropriate for implementing an optical geometry that corresponds to the desired SVI-LFD imaging technique(s). In some implementations, the optical system 110 is an add-on module that can be retrofitted to the microscope assembly 125, for example, that includes switchable optical components and optical geometries. Also, in some implementations, the microscope assembly 125 can be originally designed and manufactured with the SVI-LFD capabilities integrated therewith, and including all of the necessary components, such as the optical system 110. Additional lenses and/or other optical elements can be combined to form an objective lens, for example, of the system 100. These elements can be installed by being mounted to a section of the microscope assembly 125, for example. Moreover, a SVI light arm can be added to the microscope assembly 125. For example, the SVI light arm can be coupled to a point-scanning confocal microscope through a partially reflecting beam-splitter or a dichroic mirror (for illumination or detection lights that are of different colors).

The volumetric imaging system 100 can include a volumetric imaging apparatus 105 that is capable of being configured for implementing SVI-LFD imaging techniques described, so as to significantly reduce a signal background in comparison to some existing volumetric imaging technologies that operate in a manner which light up or illuminate the entirety of the sample. Thus, the volumetric imaging system 100 can be employed to restrict illumination from the light source 106 to a selected volume of a 3D-confined illumination of the sample 126, that can be any volume that is less than the entirety of the 3D sample 126. Thus, the system 100 realizes a solution providing higher contrast and accuracy of the light field image reconstruction by the light field detection (LFD) mechanism 115.

The microscope assembly 125 can be a microscopy platform configured for implementing existing microscopy imaging capabilities. For example, microscope assembly 125 is a point-raster-scanning confocal microscope capable of performing high-resolution optical sectioning in 3D in accordance with some existing microscopy imaging modalities. The high-resolution image data collected through the high-resolution imaging capability of the microscope assembly 125 can be used to enhance the speed, resolution, contrast, or accuracy of the image reconstruction of the SVI-LFD image data. In some cases, the optical sectioning is performed with resolution of sub-microns to 2 microns. In some implementations, the microscope assembly 125 is a light sheet microscope. The microscopy functions associated with the microscope assembly 125 can use light beams having different propagation properties (e.g., width, divergence, cross-sectional area, beam shape) than light beams utilized in the SVI-LFD imaging functions. Generating an illumination light that can be appropriately employed by each of the imaging modes, respectively, can be implemented using optical components such as cylindrical lenses, spherical lenses, engineered diffusers, prisms, and the like.

Thus, the volumetric imaging system 100 is usable for recording high-resolution 3D images, or structural images, in addition to the light-field reconstructed 3D images having lower-resolution, or light field images. In some cases, the structural images obtained using the microscopy capabilities of the system 100, are utilized to augment computational reconstruction of the light field images. Conceptually, since both images are of the same sample region, potentially separated by short times between image capture, information relating the volume of interest for the sample can be obtained from both imaging modes. Consequently, the high-resolution, rich information-content of the structural images can be utilized to guide the reconstruction of the SVI-LFD images. In some instances, using structural imaging in conjunction with light field reconstruction can provide advantages such as speeding up the processing of the reconstruction (e.g., provide a converged solution more quickly), and/or constraining the reconstruction to yield more accurate results.

According to the SVI techniques, the light source 106 can be implemented as illumination mechanisms usable with existing microscopy platforms. Also, continuous-wave lasers can be used for linear signal contrast, and pulse-lasers for non-linear signal contrast as light source 106. Additionally or alternatively, SVI techniques can be implemented with non-coherent or low-coherence light, such as light emitting diodes (LEDs). In the case of using non-coherent mechanisms for the light source 106, SVI illuminates an extended volume. In some implementations, light source 106 is a coherent light mechanism. In this case, the specific spatial regions of constructive and destructive light interference achieved by using coherent illumination light can implement the SVI aspects of light field imaging. Examples of coherent light mechanisms used for implementing light source 106 can include holography, interferometry and the like. Moreover, a light source 106 can be used to produce an illumination light having the properties necessary to change the photo-chemico-physical properties of contrast agent(s) in the sample, rendering enhanced contrast in a 3D selective volume of the sample. In some implementations, one or more additional light sources can be utilized along with light source 106. For instance, an additional light source can be used to provide light field imaging of contrast-enhancing agents.

The light field detection mechanism 115 can be utilized to detect and generate image data based on light field detection techniques. Additionally, in an implementation, the LFD detection mechanism 115 can include a camera including optics that form an image in the plane of a micro-lens array that can redirect the light field to a sensor for example. In some implementations, the LFD mechanism 115 can generate LFD imagery as digital information showing the resulting image directly on computer screen 145. Other forms of light field detection and imagery can be employed by the LFD mechanism 115 as deemed necessary or appropriate. In incorporating the SVI-LFD imaging capabilities into the microscope assembly 125, additional LFD-based imaging components can be designed as add-on modules to a microscopy platform as LFD mechanisms 115. As an example, a camera detection path can be added to the optical geometry of the apparatus, and a camera capable of capturing LFD imagery is included in LFD mechanism 115.

Moreover, the SVI techniques disclosed herein can be used in conjunction with various other LFD technologies, including, but not limited to: wave front coding with a phase-mask; spatial light modulator, or similar devices; multicolor detection by use of dichroic and band pass filters; various ways to fabricate and implement the micro-lens array, including but not restricted to using electrically-tunable oil droplets for the lenses, or non-uniform or shaped micro-lens arrays; and the like.

The computer 140 includes a processor 142 and a memory 144, and the computer 140 can be connected to a computer network 135, which can be a private network, a public network, a virtual private network, etc. The computer network 135 can be implemented as either a wired network (e.g., Ethernet) or a wireless network. The various devices of system 100, including the volumetric imaging apparatus 105 and computer 140, can be connected via network 135. Examples of computer networks include, but are not limited to, a local area network (LAN), a wide area network (WAN), and the Internet. As shown in FIG. 1, the computer network 135 is a wired network so that the volumetric imaging apparatus 105 can communicate, or otherwise transmit, data via an interface to one or more components thereof using physical connections such as Universal Serial Bus (USB) connectors. Additionally or alternatively, the devices can utilize a direct physical connection that does not necessitate using the network 135. In some implementations, computer network 135 can be a wireless local area network (WLAN), such as an IEEE 802.n network. Thus, volumetric imaging apparatus 105 and computer 140, for example, are communicatively coupled, and capable of wireless transmission of data via the computer network 135.

The processor 142 can be one or more hardware processors, which can each include multiple processor cores. The memory 144 can include both volatile and non-volatile memory, such as Random Access Memory (RAM) and Flash RAM. The computer 140 can include various types of computer storage media and devices, which can include the memory 144, to store instructions of programs that run on the processor 142.

Such programs can include SVI-LFD Imaging Software 146, which can run locally on computer 140, remotely on a computer of one or more remote computer systems (e.g., in a third party provider's server system accessible by the computer 140 via the network 135), or on a combination of one or more of each of the preceding. The SVI-LFD Imaging Software 146 can present a user interface (UI) employed for displaying, or otherwise rendering, a reconstructed volumetric image 130 of the sample on a display device 145 of the computer 140. The display device 145 can be operated using one or more input devices 148 of the computer 140 (e.g., keyboard and mouse or touch screen). Note that while shown as separate devices in FIG. 1, the display device 145 and/or input devices 148 can also be integrated with each other and/or with the computer 140, such as in a tablet computer.

The SVI-LFD Imaging Software 146 is configured to analyze, process, and manipulate the volumetric imaging data associated with the sample, that is generated by the SVI techniques of the embodiments. The SVI-LFD Imaging Software 146 can implement various SVI aspects used for selecting and performing the 3D-restricted volume analysis of the 3D sample. As an example, for a given volume of interest the SVI-LFD Imaging Software 146 is configured to determine multiple regions of the interest, and perform command and/or control of the various components necessary to perform excitation and imaging of the regions sequentially according to the techniques. As another example, the SVI-LFD Imaging Software 146 can be implemented to automatically compute, select, or control various other facets of SVI, such as the appropriate SVI approach (e.g., static-optical-volume SVI), the adjustment of the optical geometry, selection of the excitation mode, etc. Also, the SVI-LFD Imaging Software 146 implements various aspects of the LFD imaging capabilities of the system 100. In some implementations, the SVI-LFD Imaging Software 146 is configured to generate volumetric imaging data of the 3D sample by performing a computational reconstruction of the LFD imagery. In some implementations, SVI-LFD Imaging Software 146 is programmed to control illumination of a volume of interest, and effectuate movement of any electromechanical components needed to appropriately adjust the optics for performing SVI-LFD operations (e.g., scanning). For instance, the SVI-LFD Imaging Software 146 can cause illumination of the 3D sample in a patterned or structured fashion. The combination of patterned and/or structured illumination can result in a detected light field covering the desired 3D space of the sample, and enable an optimized computational reconstruction of the final image data captured from the detected light fields.

Figure 2C:
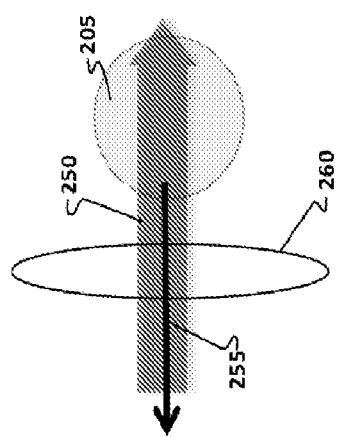
FIGS. 2A-2C show examples of general optical geometries for implementing SVI techniques described herein, applicable to various static-optical-volume and scanned-optical-volume approaches.
Figure 2B:
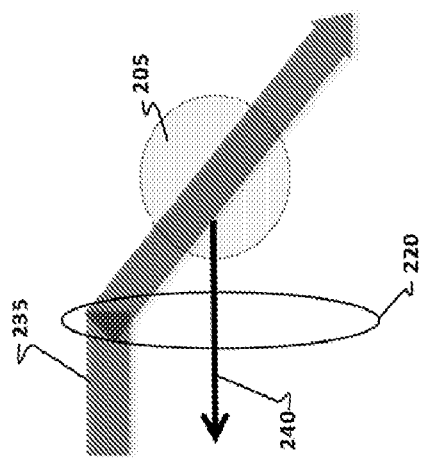
Figure 2A:
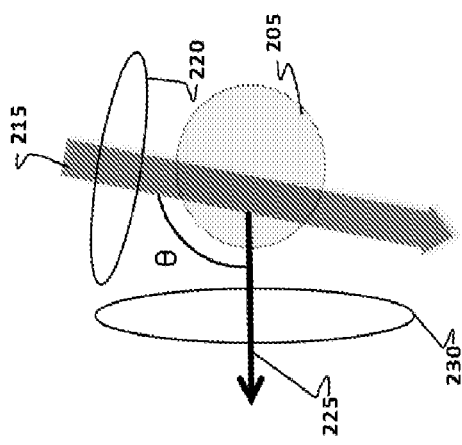

FIGS. 2A-2C show examples of optical geometries for implementing SVI techniques described herein, according to various static-optical-volume approaches. In some cases, the static-optical-volume approaches for implementing SVI potentially provide additional advantages as compared to other described approaches (shown in FIGS. 3A-3E and FIGS. 4A-4C). For instance, in scenarios involving imaging biological samples with larger volumes, performance trade-offs in precision (e.g., defining the boundaries of the volume) can be made in favor or ease of implementation as compared to other SVI approaches (e.g., less optical elements than in endoscopy and multi-view approaches), and decreased potential photo-induced damage to the sample.

Common among the optical geometries for the static-optical-volume approaches in FIG. 2A-2C is that the illumination light can be formed using a direct light beam. In this implementation, a direct light beam is used to shape the illumination light, and produce a spatially-extended light volume that fills the desired volume of interest, namely the 3D-confined illumination of the 3D sample 205. FIG. 2A shows sample 205 as a biological specimen to be volumetrically imaged according to the SVI-LFD techniques. In some implementations, propagation invariant optical beams, such as Bessel or Airy beams, can be used. These types of beams are usable to yield the potential advantage of longer axial extent for a given beam waist, which improves the precision in illuminating the excitation volume and results in a more accurate 3D-confined illumination.

FIG. 2A shows a static-optical-volume-volume approach which employs dedicated optical elements for the illumination light 215 for excitation of the sample 205, and the light field 225 which comes from the sample 205, respectively, in order to achieve the SVI aspects of volumetric imaging. As illustrated, the illumination light 215 is emitted into the sample 205 through a lens 220 that is different than the lens 230 used for propagating the light field 225. In some implementations, the lens 220 used for illumination is a microscope objective lens. In some implementations, the lens 230 used for detection is a detection objective lens. Thus, the sample 205 can be illuminated through an illumination light path, in which the illumination light propagates, that is separate from the light detection light path 215, in which the light field emanating from the sample 205 propagates. Additionally, it is illustrated that the light detection light path for the light field 225 is non-collinear to the illumination light path for the illumination light 215. That is, the light paths traveled for illumination and detection are not along the same line. FIG. 2A shows an optical axis of illumination that is at an angle theta (θ) from an optical axis of detection. According to the techniques described, this non-collinear nature of the illumination light path, for the illumination light 215, and the light detection light path, for the light field 225, allow for a 3D-confined illumination of the 3D sample 205, and therefore achieving SVI. In some cases, the optical geometry is adjusted such that the angle theta (θ) is 90° in order to achieve SVI. In some implementations, it is sufficient to perform SVI by adjusting the corresponding optical geometry so as to arrange the light detection light path and the light detection light path at one of any of a range of angles for θ that is greater than zero. By employing an axis of illumination, in respect to the focal plane of lens 220 that is non-collinear to the axis of detection, in respect to the focal plane of lens 230, the illumination of the sample 205 is restricted to a 3D volume of interest, thereby minimizing signal background that can be detrimental to the final contrast and accuracy of the computational reconstruction of the light field imaging techniques.

FIG. 2B illustrates another implementation for the static-optical-volume approach, in which the optical geometry is arranged to emit the illumination light 235 through the same lens also used for detection, namely lens 220. In some implementations, lens 220 is a microscope objective lens. The light field 240 which comes from sample 205 propagates through lens 220. Thus, as illustrated, the illumination light path and the light field detection path traverse through the single lens 220. To achieve SVI in accordance with the optical geometry shown in FIG. 2B, the illumination light is sent through lens 220 off-center. In some implementations, the illumination light 235 is delivered, from the light source for example, at an oblique angle to the imaging plane of the sample 205. The detection light path is collinear with the optical axis of the common optical element 220, forming an angle theta (θ) that is greater than zero with the illumination light path. The oblique-angled nature of the detection path allows multiple detection paths to be carried out simultaneously, or sequentially, through the same microscope objective, without the need to physically rotate the sample. Consequently, although a common lens 220 is shared for the illumination light 235 and the light field 240, the illumination and detection paths remain non-collinear in a manner similar to that shown in FIG. 2A. Thus, employing the oblique-angle illumination strategy as a part of the optical geometry yields SVI.

In some implementations, adjusting the corresponding optical geometry so as to arrange the illumination light path at one of any one of a range of angles that is both greater than zero, and not 90°, is sufficient for creating an oblique illumination light path and optimizing excitation to the volume of the 3D-confined illumination of the sample 205. In some cases, the oblique-angle illumination approach in FIG. 2B can be used to implement SVI aspects for imaging performed by a microscope assembly (shown in FIG. 1) in addition to some existing microscopy capabilities of the microscope, such as confocal raster-point laser scanning. In some instances, this implementation uses one-photon excitation mode and switchable optical geometries to support operating in either of SVI-LFD imaging mode or confocal microscopy mode, for example. Implementations involving using SVI-LFD based imagery with additional imagery, captured using another microscopy mode, is discussed in detail in reference to FIG. 1.

The static-optical-volume approaches of FIGS. 2A-2B can employ various linear-excitation modes to capture the optical signal contrast. The linear-excitation modes can include, but are not limited to: one-photon excitation fluorescence; elastic light scattering; and in-elastic light scattering (e.g., Raman or Brillouin scattering). In some implementations, where signal contrast is through elastic scattering of the illumination light, techniques such as Raleigh or Mie scattering, or combinations thereof, provides a label free method to observe biological structures and processes. In the instances where signal contrast of SVI is through in-elastic scattering of illumination light, the signal contrast is label free and yields spectroscopic information on the sample. In employing a linear-excitation, a signal intensity can be generated that is proportional to the first power of the illumination light intensity, therefore providing the necessary spatial constraint to yield SVI.

FIG. 2C depicts another example of an optical geometry used for implementing the static-optical-volume approach for SVI techniques, using a shared optical element for illumination and detection, similar to the optical geometry shown in FIG. 2B. However, it is illustrated in FIG. 2C that the illumination light 250 and the light field 255 emanating from the sample 205 propagate collinear to each other. That is, the light path and the light field detection path are aligned along the same axis, rather than arranged to be non-collinear as in the previously discussed optical-static approaches (shown in FIGS. 2A-2B). In the collinear optical geometric configuration, to avoid similar function of some existing microscopy approaches (e.g., wide-field illumination) and its drawbacks, non-linear multi-photon excitation is used.

In order to accomplish the SVI techniques described, the optical geometry of FIG. 2C also enables the use of non-linear modes of optical excitation to generate signal contrast. For example, multi-photon excitation includes the interaction of the sample 205 with two or more photons at near simultaneity to produce the optical signal contrast. These signal contrasts can include two-photon-excited fluorescence, second harmonic generation, three-photon-excited fluorescence, and higher-order processes. In these multi-photon modes, the signal intensity is proportional to the second (or third) power of the excitation intensity, for processes that involve two (or three) photon-excitation, leading to a natural confinement of the excitation volume in 3D space, in instances where a focused beam is used to illuminate the sample (shown in FIG. 2D). This nonlinear excitation confinement can be leveraged as a key working principle of implementing the SVI approaches, in addition to some existing capabilities of multi-photon raster-point laser scanning microscopes.

Moreover, the static-optical-volume approaches corresponding to the optical geometries shown in FIGS. 2A and 2B also work with nonlinear excitation. With the optical geometry illustrated in FIG. 2C, even with the illumination light 250 and the light field 255 collinearly arranged, the use of non-linear multi-photon optical excitation will yield efficient SVI due to the nonlinear confinement of excitation. In some implementations, the illumination light 250 and the light field 255 are received through the same microscope objective lens 260. Also, in some instances, the signal mode is implemented as multi-photon excitation fluorescence (e.g., two-photon florescence, second harmonic generation, three-photon-excited fluorescence). Because of the non-linear confinement of the signal, each of the static-optical-volume approaches for SVI described herein should provide efficient SVI. The optical geometry shown in FIG. 2C, in some cases, can be used to implement the combination of SVI-LFD techniques with some conventional microscopy techniques, such as multi-photon fluorescence microscopy.

Figure 2D:
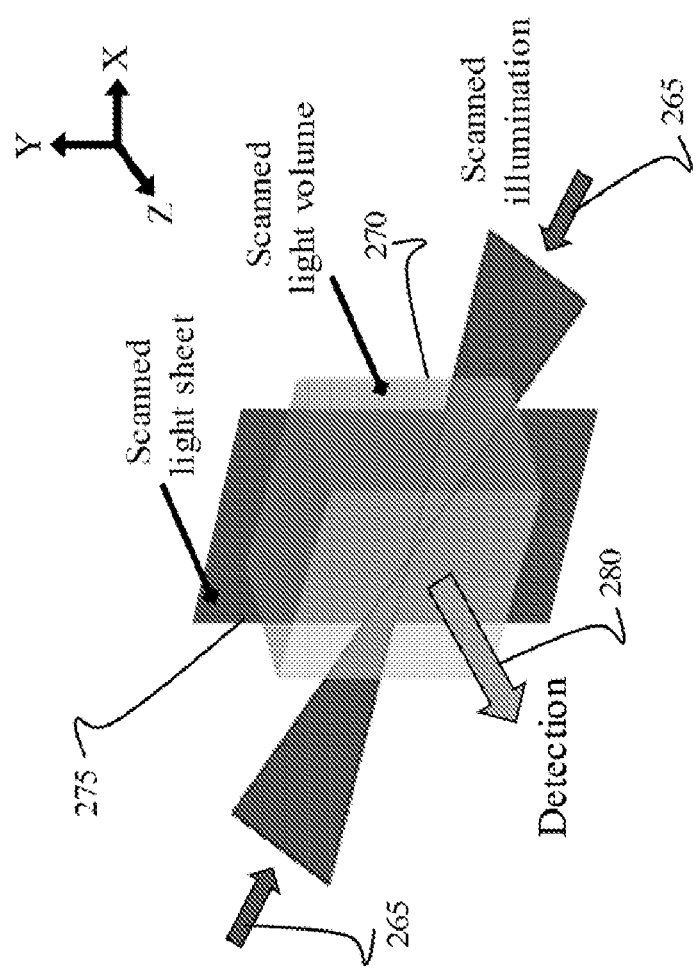
FIG. 2D shows an example of an optical geometry for implementing SVI techniques described herein, according to a scanned-optical-volume approach.

FIG. 2D shows an example of an optical geometry for implementing SVI techniques described herein, according to a scanned-optical-volume approach. According to this technique, SVI is achieved as the illumination light 265 is a focused beam of light used to selectively scan, or "paint out", the volume of interest of the sample 270, as opposed to illuminating the entire sample. Depending on the size and shape of the focal region, the excitation volume is "painted out" (i.e., filled) by scanning in one, two, or three dimensions. Importantly, all different manifestations of the static-optical-volume approach described previously are amenable to the scanned-optical-volume approach. Also, in the scanning approach, the detection optics for capturing the light field image, such as a detection camera, are exposed for a time duration that is needed for the whole 3D-confined volume to be scanned. Thus, one exposure time is sufficient for scanning the entirety of the volume of interest of the sample, precluding the need for a piecemeal scanning of segments of the volume of interest using multiple exposure times (e.g., an exposure time for each segment to be scanned). In the instances where fast scanning is implemented, for example scanning hardware with high rotational speeds, multiple rounds of scanning the specified volume can be performed in a single exposure time. Performing SVI in accordance with scanned-optical-volume techniques can provide multiple advantages, such as increased precision (e.g., down to micron-level) in defining the SVI. Thus, scanning implementations of SVI can be desirable in scenarios where the design trade-offs of using more sophisticated hardware, as compared to the static-optical-volume approaches (shown in FIGS. 2A-2C), are tolerable for more precise imaging.

As illustrated, a scanned sheet of light 275 can be formed by shaping the illumination light 265 into a static 2D sheet of light, using various optical elements arranged for focusing light, such as cylindrical lenses. Thereafter, the light sheet 275 can be scanned in a third dimension, to optimize illumination to the 3D-confined illumination volume of the sample. In some cases, scanning is implemented by scanning the focal region utilizing rotating/translation devices included in the optical configuration, such a galvanometers or resonant scanners, or acousto-optic devices such as acousto-optic deflectors.

In some cases, an optical geometry for the scanned-optical-volume approach adjusts the illumination light 265 (shown along the x axis) at an angle theta θ that is greater than zero with respect to the detection direction 280 of the light field (shown along the z axis). Therefore, the illumination light 265, which is a focused light beam, will appear as a nominal line within the field of view defined by the detection optics. Then, to achieve SVI for a 3D volume, the illumination light can be scanned in two-dimensions.

The scanning approach can implement SVI with non-linear excitation using multiple optical configurations, even in cases with collinear illumination and detection paths (shown in FIG. 2C), due to the confinement of the signal contrast generation only at the focused region. To enhance the coverage and reduce the photo-induced biological damage often associated with high light intensities, low-numerical-aperture focused excitation beams can be used, as shown in FIG. 1C, to have an extended axial extent at the focal region. Then, 2D scanning of the focus spot will automatically yield a 3D excitation volume, achieving SVI. Note that the larger cross-sectional area of low-numerical-aperture focused beams will have minimal effect on the final achieved resolution of SVI-LFD, since resolution in this case does not depend on the illumination beam size but on the overall optical properties of the LFD arm (detection numerical aperture, tube lens focal length and aperture, lens array parameters, camera pixel size, etc.).

Figures 3A, 3B:
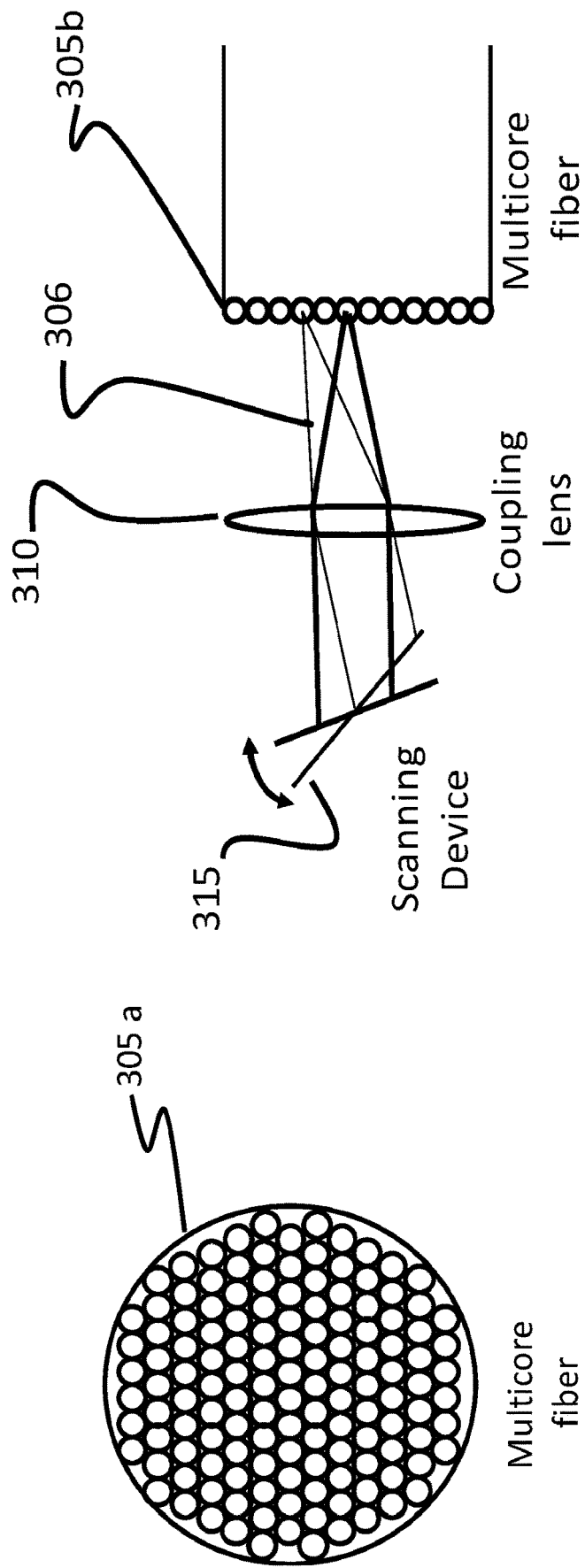
FIG. 3A shows an example of a multi-core fiber for use with an endoscopic implementation of SVI-LFD imaging techniques.
FIGS. 3B-3F show examples of optical geometries for use with endoscopic implementations of SVI-LFD imaging techniques.

FIG. 3A shows an example of a multi-core fiber 305a for use with an endoscopic implementation of SVI-LFD imaging techniques. For example, an endoscope is integrated into the volumetric imaging system (shown in FIG. 1) for providing video imaging capabilities while applying SVI-LFD imaging techniques. Implementations involving endoscopy can provide the advantages associated with performing SVI-LFD imaging remotely, or at locations otherwise inaccessible to some microscopy-based imaging techniques. FIG. 3A illustrates a multi-core fiber 305a to deliver the illumination light for excitation of a sample, or to relay the detected light along the detection light path, whenever an image is to be transmitted, in accordance with the endoscopic embodiments. Additionally, a single-core fiber can be used for either the illumination or detection light path, whenever non-imaging light needs to be transmitted along the light paths. Thus, SVI-LFD imaging can be accomplished with an endoscope, having multi-core fiber 305a and/or a single-core fiber, or any multiple combinations thereof, as light delivery mechanisms, that is used with the volumetric imaging system (shown in FIG. 1), in accordance with any of the SVI techniques and optical geometries and configurations previously described. Typically, in an endoscopic imaging application, the various optical components and assemblies that are close to the sample are small in size, enabling proximity delivery and collection of light to and from the sample.

FIG. 3B shows an example of an optical geometry for use with an endoscopic implementation of SVI-LFD imaging techniques. It is illustrated in FIG. 3B that an illumination light beam 306 is scanned by the scanning device 315 and optically coupled into different cores of a multi-core optical fiber 305b, which is a part of an endoscope, by using a coupling lens 310. This light beam is carried by the endoscope to a remote location that is otherwise inaccessible to some microscopy-based imaging techniques. Since the light beam is carried by multiple cores, the light beam exiting the endoscope and illuminating the sample scans or paints out a selective 3D volume of the sample in accordance with any of the SVI techniques previously described. Examples of scanning devices include galvanometers, resonant scanners, acousto-optical deflectors, digital micro-mirror devices, executing scans in 1, 2, or 3 directions, or in any combination of multiple directions.

Figure 3C:
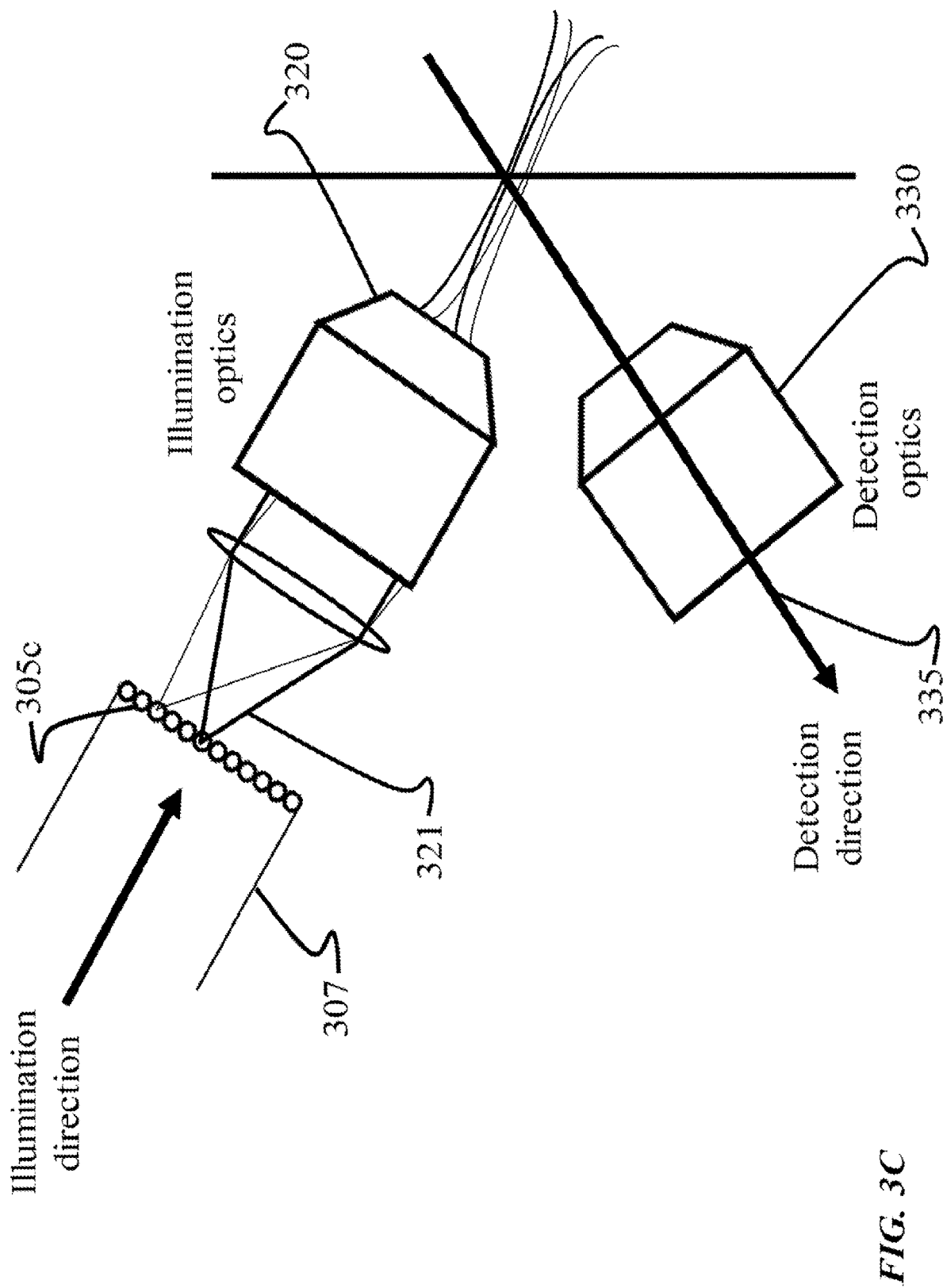

FIG. 3C shows an example of another optical geometry for use with an endoscopic implementation of SVI-LFD imaging techniques. In FIG. 3C, a multi-core fiber 305c is utilized for delivery of the excitation light from endoscope 307 to the illuminated a sample, and free-space optics are employed for the light field detection aspects of the optical geometry. The light is illustrated as propagating through an illumination objective lens 320, and focused to a point and scanned in two dimensions, or to a line and scanned in one dimension at the proximal face of the fiber bundle. In some instances, the distal end, i.e. the end away from the sample, of the endoscope is coupled to the microscope assembly of the volumetric imaging system (shown in FIG. 1). In this case, both excitation and detection can be accomplished using a single objective lens, using an optical geometry that is similar to that depicted in FIG. 2B, in reference to the static-optical-volume approach for SVI. FIG. 3C shows the use of two lenses, in the optical geometric configuration, illumination objective lens 320 for receiving the illumination light, and detection objective lens 330 for receiving the light field 335 for detection. In some implementations, the optical geometry shown in FIG. 3C can be adjusted to arrange the two objective lenses 320, 330 at an angle theta θ that is less than 90°. In another implementation, the optical geometry can be adjusted to include a miniature prism to turn the illumination light 321 by an angle of 90° in order to arrange the illumination light path and detection light path orthogonally to each other in order to achieve SVI techniques as described to optimize excitation of the sample volume.

Figure 3D:
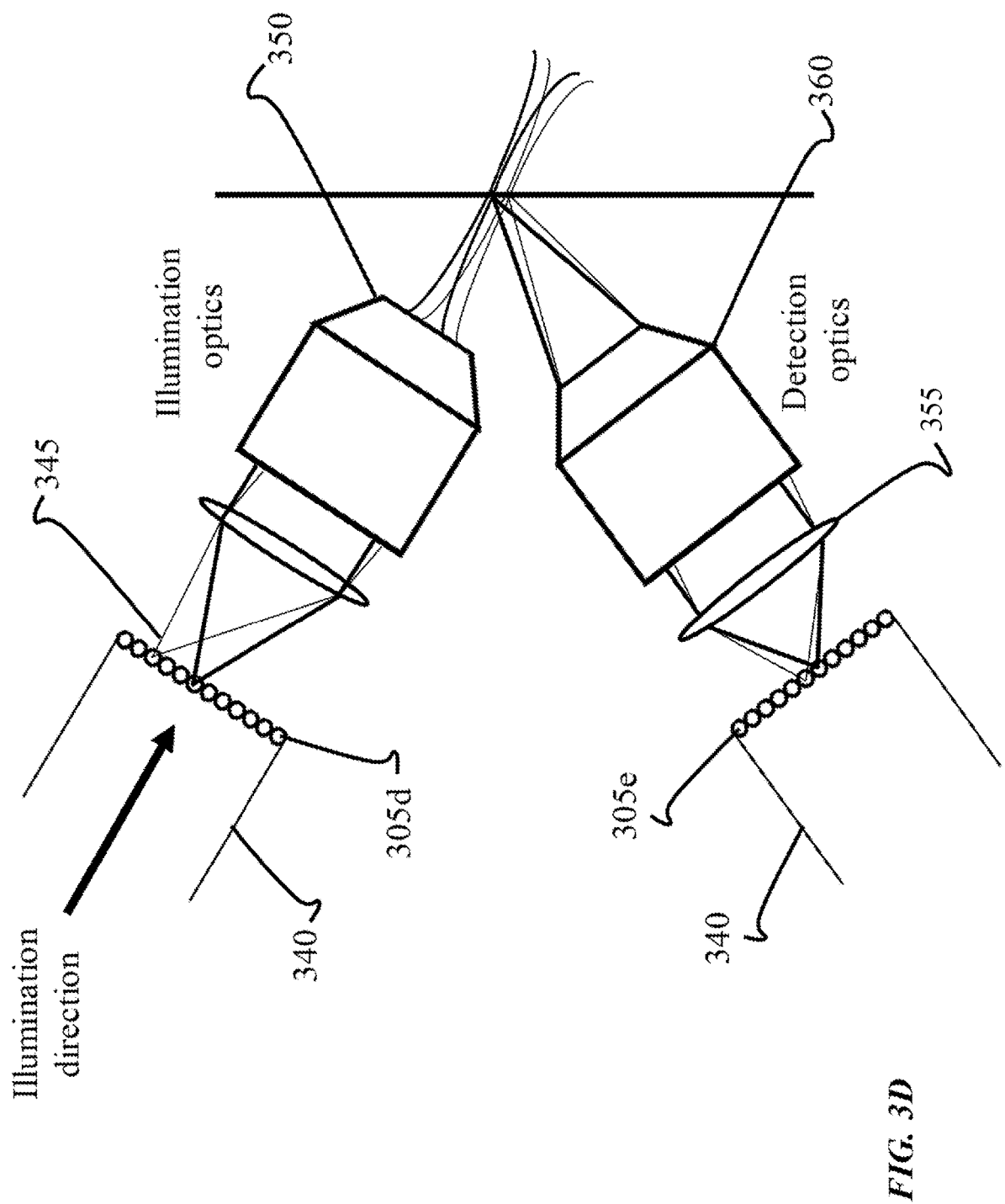

FIG. 3D shows an example of another optical geometry for use with an endoscopic implementation of SVI-LFD imaging techniques. In the example shown, a multi-core fiber 305d is a delivery fiber for the endoscope 340, and used to deliver the excitation light 345 to a sample. The optical geometry is also shown as using an illumination objective lens 350 and a tube lens 355 for creating an image, according to the SVI-LFD imaging techniques disclosed herein. In some cases, the illumination objective lens is implemented as a miniature objective lens. The image is then relayed to a distal face of the endoscope 340 using another multi-core fiber 305e. Similar to the optics in FIG. 3C, the excitation light 345 is a beam that is focused to a point, and scanned in two dimensions, or to a line and scanned in one dimension at the distal face of the fiber bundle. FIG. 3D is referred to as depicting two multi-core fibers 305d, 305e as being in the same endoscope 340. A detection objective lens 360 is illustrated as receiving the propagating light field for detection, as it is reflected, and directed towards the other multi-core fiber 305e of the endoscope 340 used for imaging. Alternatively, an implementation can include having each of the multi-core fibers 305d,305e being present in a different endoscope, and thus having two separate endoscopes in the optical geometry. In this case, both the excitation and detection aspects of SVI-FLD techniques can use a single objective lens as discussed in reference to FIG. 3C. Alternatively, an implementation can include multiple single core fibers used for excitation and detection aspects of SVI-LFD that are arranged in a single or multiple endoscopes. In another implementation, the optical geometry can be adjusted to include a miniature prism, similarly as discussed in reference to FIG. 3C.

Figure 3E:
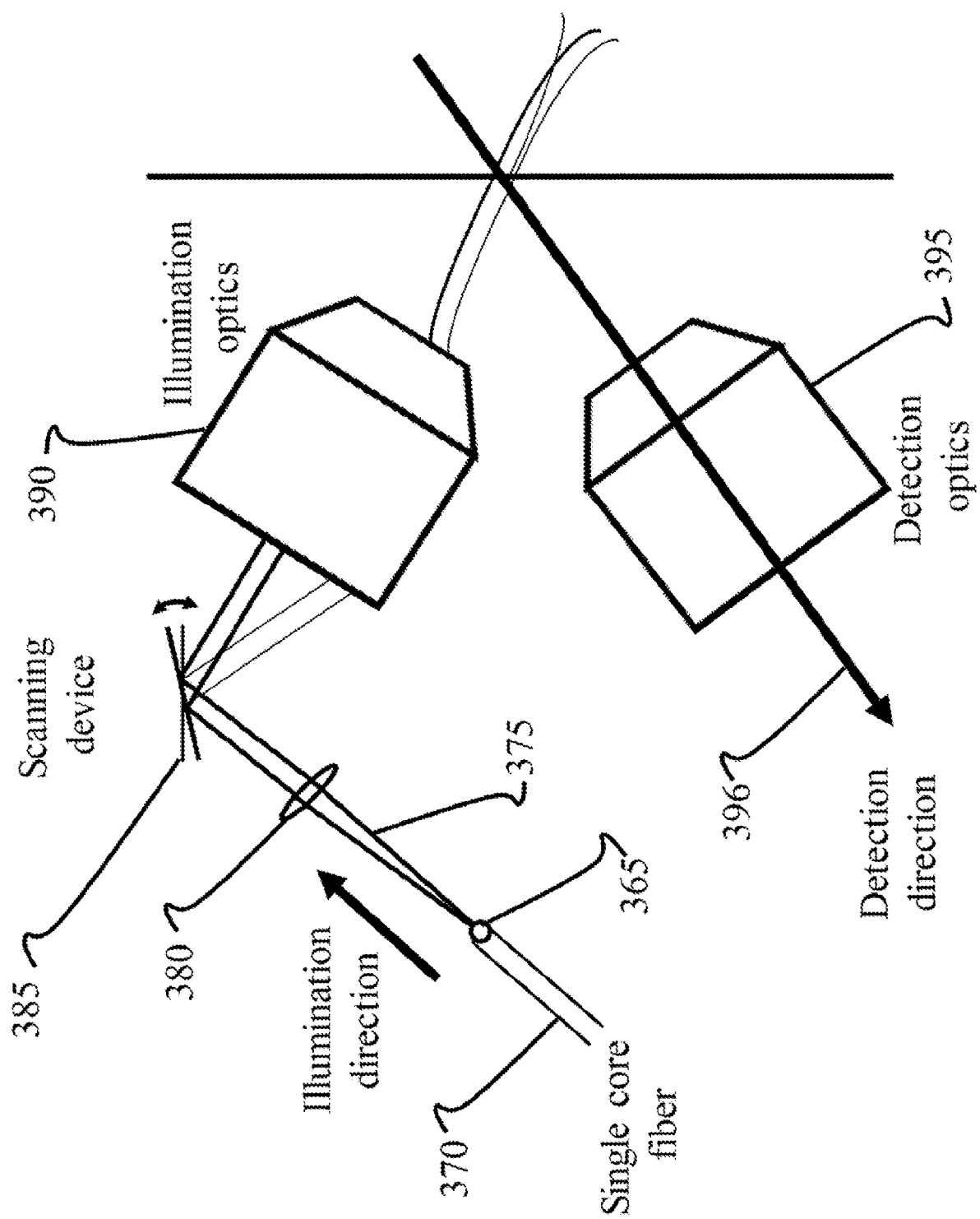

FIG. 3E shows an example of another optical geometry for use with an endoscopic implementation of SVI-LFD imaging techniques. In this example, endoscopy is performed using a single core fiber 365 to deliver the excitation light from an endoscope 370, rather than a multi-core fiber as shown in the optical geometries in FIG. 3A-FIG. 3D. The excitation light 375 is delivered as a beam, propagating through a lens 380, that is further scanned using a scanning device 385, which can be a Micro-Electromechanical Systems (MEMS) mirror device. FIG. 3E indicates that the scanning device 385 is configured to be rotated in the x-y direction. Additionally, in some optical geometries, multiple scanning devices can be used. The light is then shown as being received by an illumination objective lens 390, and subsequently reflecting in the direction for detection through the detection objective lens 395 and along the detection direction 396. In some implementations, two scanning devices can be employed. A micro lens array (not shown) can be located at the proximal end of the endoscope that is used to create the light field image, which is then relayed to the distal face of the endoscope 370, for instance using another multi-core fiber. Thus, as an example, an optimal geometry for endoscope-based SVI can use a single core fiber, and a multi-core fiber.

Figure 3F:
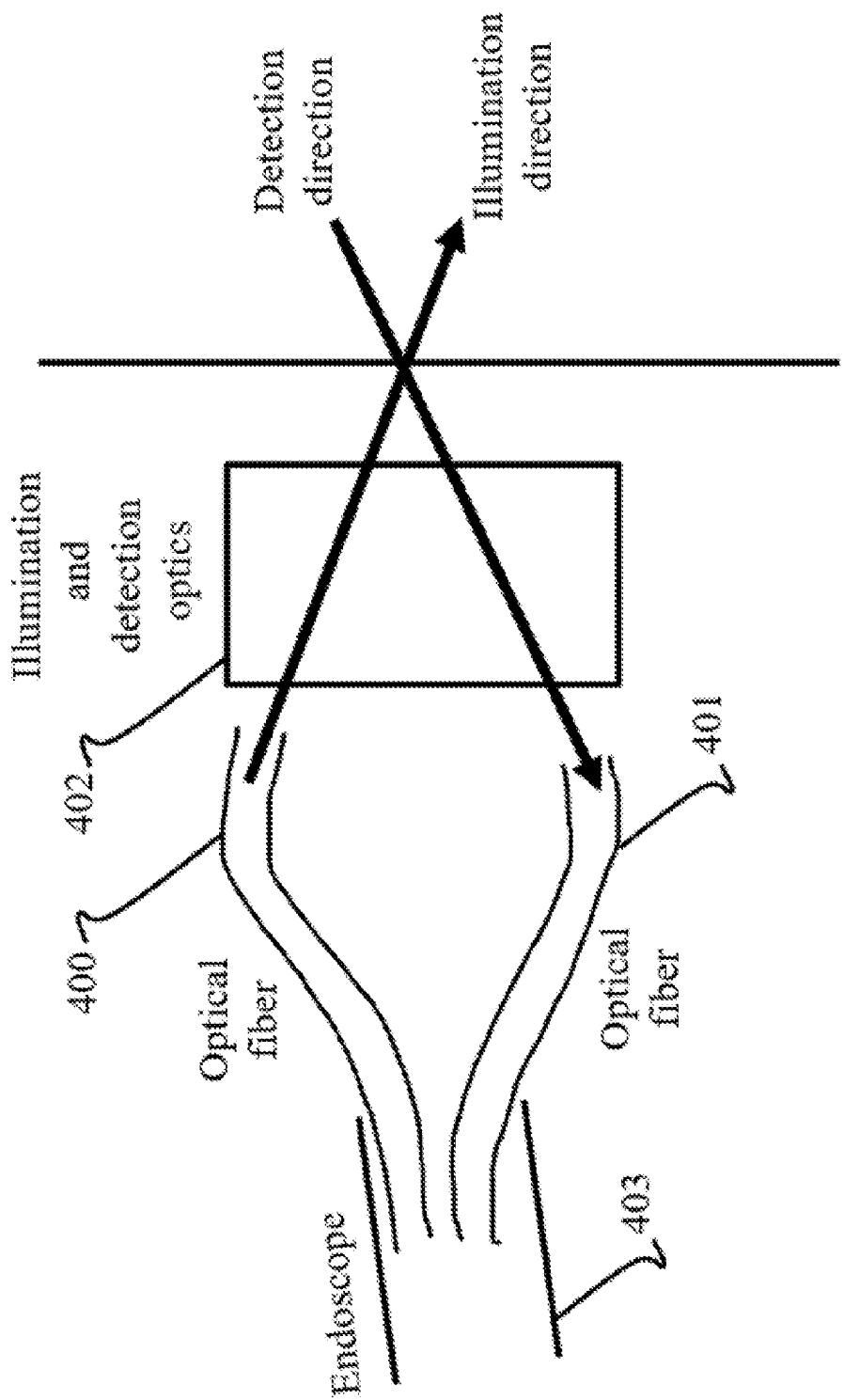

FIG. 3F shows an example of an optical geometry where fibers 400 and 401 are used to transmit the illumination and detection light, respectively, and the illumination and detection light propagate through a common optical system 402, following the various implementations described previously for the case where no fibers are used in the imaging apparatus. The optical fibers 401 and 402 can be multi-core or single-core, and together they form the endoscope 403 which enables SVI-LFD imaging of samples that otherwise not spatially accessible.

FIGS. 4A-4C show various examples of optical geometries for use with an implementation of SVI using multi-view LFD imaging techniques. Each of the previous approaches and implementations used to achieve the SVI-LFD imaging techniques disclosed herein, have been generally described as imaging the sample using one direction for detection, thereby capturing LFD imagery data from a single viewpoint. However, multi-view LFD imaging involves employing various optical geometries allowing for a detection light field to be captured from multiple directions and/or views, which effectively results in imaging the sample volume from more than one direction. As an example, an optical geometry capable of supporting multi-view LFD imaging can include using multiple pairs of substantially orthogonal objective lenses for illumination and detection to image the sample 3D volume, in a manner somewhat similar to that of the optical geometry shown in FIG. 2A (using a single lens for illumination and detection). SVI is achieved in each of these instances of multi-view imaging. Consequently, the multi-view LFD imaging techniques can realize various advantages associated with imaging a 3D volume of interest using multiple and varying perspectives. For instance, computational reconstruction of LFD imagery that is generated from more than one direction according to the multi-view techniques, can subsequently be combined to yield a final image with higher resolution and/or better spatial coverage.

In some implementations imaging with more than one view of the sample, can be achieved by sequentially rotating the sample through the multiple views; or/and by employing more than one pair of illumination-detection optical systems, oriented to look at the sample through different views, and the different views are imaged simultaneously or sequentially, without the need to physically rotate the sample. The resulting image datasets from the multiple views could then be combined and reconstructed to yield a final image with higher resolution and/or better spatial coverage.

FIG. 4A show an optical geometry for use with an implementation of SVI using multi-view LFD imaging techniques. It is illustrated in FIG. 4A that multi-view optics involve using a single primary objective lens 405, and more than one detection micro-lens array 410a, 410b. By placing the pair of detection micro-lens arrays 410a, 410b, each with its optical axis making a finite angle with the optical axis of the primary microscope objective 405, the light field 415 can be captured from multiple views, thereby imaging the sample volume from multiple directions. Additionally, illumination light 420 is propagated along more than one axis of illumination. The illumination light 420 is then reflected using a mirror 425, to be directed towards the sample, thereby creating more than one imaging volume 430a, 430b associated with a different view. Accordingly, the light field 415 captured from the illuminated volumes 430a, 430b by each micro-lens array 410a, 410b is further captured using cameras in order to generate LFD imagery corresponding to the respective view. In some implementations, more than two micro-lens arrays can be used in the optical geometry, so as to cover the full angular range of the light field space. The multi-view light field imaging described here, with multiple detection micro lens arrays and cameras, accomplishes a detection regime equivalent to capture of the sample light field with higher numerical aperture and larger camera sensor area (than what can be achieved with a single micro lens array and a single camera).

In some cases, the number of optical detection elements (corresponding to the number of imaging views) implemented using the optical configuration in FIG. 4A, is a tunable feature that can be adjusted to achieve a desirable result. There can be trade-offs associated with increasing the number of detection elements used in the optical arrangement. For instance, more micro-lens arrays used can capture more angular views, but can potentially diminish the numerical aperture (and resolution) for each array, while the final reconstructed resolution can depend both on the number of views and the intrinsic resolution achieved in each view. In some scenarios, a determination on the number of micro-lens arrays used, for example, can depend on imaging variables such as the desired resolution and the determined 3D sample field of view. Detection of the light field with a substantially large number of micro-lens arrays oriented at finite angles to the main optical axis allows the capture of both high numerical apertures through the primary microscope objective (i.e., more angular information), but without the penalty of reduction in axial (z-axis) coverage.

The optical geometry depicted in FIG. 4A employed for multi-view LFD imaging, can also be adjusted for providing SVI techniques. For example, illumination light 420 is illustrated as being delivered parallel to the main optical axis of the primary microscope objective 405, adjusted to cover, in the xy-plane, the desired xy-cross section of the volume of interest. Also, the illumination light 420 is directed along the central optical axis of the microscope objective and the detection path is along an oblique-angle direction of the microscope objective 405. The oblique-angled nature of the detection path allows multiple detection paths to be carried out simultaneously, or sequentially, through the same microscope objective 420, without the need to physically rotate the sample. Moreover, since the detection volumes are at an angle to the main optical axis, SVI is achieved. In some instances, the optics can be appropriately adjusted allowing the detection volumes (detection) to be orthogonal to main optical axis (illumination). In some implementations, the sample 3D volume is selected for SVI techniques using linear optical excitation. In some implementations, the SVI techniques are achieved using non-linear multi-photon optical excitation. FIG. 4A depicts two oblique-angled detection views, but more views can be carried out to cover more of the light field angular range coming from the sample. For instance, on the image-side of the microscope objective 405, beam-splitters of various types (e.g. dichroic or partially-reflecting) can be used to separate the paths of illumination and detection into different directions. The multiple detection views are recorded in various ways, e.g. with multiple micro-lens arrays 410a, 410b and camera-optical systems oriented at the appropriate angles, as depicted in FIG. 4A. In some cases, multiple oblique-angled illumination direction paths can be utilized to provide the SVI for the multiple oblique-angled detection paths.

Another example of an optical geometry for use with an implementation of SVI using multi-view LFD imaging techniques is shown in FIG. 4B, where an overlapping region between multiple imaging views is produced. The hatched region 435 represents an overlap between the volumes detected with corresponding imaging views, namely volume 440a of a first imaging view and volume 440b of a second imaging view. Accordingly, a benefit of multi-view LFD imaging is realized as the computational reconstruction of both of the depicted views (having a shared imaged volume that produces more imagery data associated with that particular volume) can yield a final 3D image of the overlapping volume 435 with higher resolution.

Also, the illumination shown in FIG. 4B includes multiple side illuminations 445a, 445b located on either side (i.e., left, right) of, and forming an angle with respect to the axis of, a central illumination 445c. Also, the side illuminations 445a,445b are oblique-angled illumination with respect to the optical axis of the microscope objective. The central illumination 445c is an illumination that is directed along the central axis of the microscope objective. The optical geometry in FIG. 4B is configured such that a right side illumination 445b allows for SVI for detection of the view associated with volume 440b, while a left side illumination 445a allows for SVI for the volume 440a of the other view. Thus, LFD image acquisition can involve sequentially imaging a view associated with the right-side illumination 445b and, then imaging of another view associated with left-side illumination 445a. Accordingly, each view of the multi-view LFD imaging performed can have a more optimal high contrast SVI. In some implementations, the multi-view imaging techniques can decrease the imaging rate associated with the process by a rate relational to the number of views. For instance, the example shown in FIG. 4B using two imaging views can decrease the imaging rate by a factor of two. This can be beneficial in scenarios where high-speed imagining is not as desirable as high imaging resolution.

FIG. 4C shows an example of another optical geometry for multi-view LFD imaging techniques, where the optical paths associated with each of the multiple imaging views are separated by the optics. In FIG. 2C, an optical element, shown as a reflecting (mirrored) prism 450 is included in the optical geometry for manipulating light in a manner which separates the optical paths for different imaging views. The reflecting prism 450 is illustrated as being placed at the image-side of the primary microscope objective lens 455. Illumination light 460a, 460b is emitted towards the reflecting prism 450. In this case, illumination is directed to two opposing sides of the reflecting prism 450, representative of a corresponding imaging viewpoint based on each illumination side. The illumination light 460a (left side) and 460b (right side) is then reflected, or otherwise re-directed, by the prims' 450 surface (at a right angle), at both sides, having two separate illumination paths. Each distinct illumination path propagates the illumination light 460a,460b through the primary objective lens 455 to create multiple illuminated volumes of the sample, corresponding to a respective imaging view 465a, 465b.

Additionally, the light fields 462a, 462b are shown to have separate optical paths, due to the reflecting prism 450. Thus, the optical geometry allows for a detection, using micro-lens arrays for example, of the light field 462a of an imaging view and light field 462b of another imaging view to be done at separate locations. In some cases, this optical arrangement provides more space, for example to implement a camera detection of the light field captured by each micro-lens array. In some implementations, the optics used to arrange separate optical paths is another optical element with reflective properties, such as dichroic mirror that transmits the illumination light and reflects the detected light. In this case, the illumination light can be delivered along the optical axis of the primary microscope objective 455. Although FIG. 4C shows an example of an optical geometry using two reflecting surfaces to redirect the different imagining views, more than two surfaces (more than two illumination and detection paths) can be used in some implementations in order to cover the full angular range of the light field back at the microscope objective lens 455.

Additional types of illumination mechanisms can also be used in each of the various approaches and implementations previously described herein, to appropriately achieve SVI aspects of the embodiments. In various implementations, selective volume illumination is accomplished by manipulating a coherent nature of illumination light, that is characteristic of some light emitting technologies such as holography, interferometry, and the like. Accordingly, coherent light sources can be used for illumination of a sample in any of the disclosed SVI-LFD imaging embodiments, to achieve specific spatial regions of constructive and destructive light interference, thus yielding a selective illumination at the desired volume of interest. In some implementations, coherent light techniques can generate an image contrast using either linear optical excitation, or non-linear multi-photon optical excitation.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A volumetric imaging apparatus comprising:
   a light source configured to emit an illumination light that propagates via an illumination light path to illuminate a three-dimensional (3D) sample; and
   an optical system arranged with respect to the light source to receive a light field, which comes from the illuminated 3D sample, wherein the light field propagates via a detection light path;
   wherein the light source, the optical system, or both, are configurable to perform selective volume illumination, which selects a volume of a 3D-confined illumination of the 3D sample based on the 3D sample to be illuminated and a light field detection (LFD) process to be applied, wherein the volume of the 3D-confined illumination is a selected 3D volume of the 3D sample to be particularly excited by the 3D-confined illumination for imaging.

2. The apparatus of claim 1, wherein the detection light path is non-collinear to the illumination light path, and the selected 3D volume of the 3D sample to be particularly excited by the 3D-confined illumination is selected by adjusting a 3D optical geometry of the illumination light in relation to the optical system.

3. The apparatus of claim 2, wherein the selected 3D volume of the 3D sample to be particularly excited by the 3D-confined illumination is selected using linear optical excitation.

4. The apparatus of claim 2, wherein the optical system comprises a common optical element arranged to (i) receive the illumination light that propagates via the illumination light path to illuminate the 3D sample, (ii) receive the light field that propagates via the detection light path which comes from the illuminated 3D sample, and (iii) adjust the 3D optical geometry of the light source for selecting the selected 3D volume of the 3D sample to be particularly excited by the 3D-confined illumination, and wherein the illumination light propagates along an oblique-angle path through the common optical element, and the detection light path is collinear with an optical axis of the common optical element, forming an angle theta that is greater than 0 with the illumination light path.

5. The apparatus of claim 4, wherein the selected 3D volume of the 3D sample to be particularly excited by the 3D-confined illumination is selected using (i) a focused light beam shaping of the illumination light, and (ii) the 3D optical geometry of the light source adjusted to illuminate multiple sub-regions of the selected 3D volume of the 3D sample in a scan across an entirety of the selected 3D volume of the 3D sample during an exposure time.

6. The apparatus of claim 4, wherein the apparatus comprises an endoscope.

7. The apparatus of claim 2, wherein the optical system comprises (i) a first optical element arranged to receive the illumination light that propagates via the illumination light path to illuminate the 3D sample, and (ii) a second optical element arranged to receive the light field that propagates via the detection light path which comes from the illuminated 3D sample, wherein the first optical element and the second optical element are arranged to adjust the 3D optical geometry of the illumination light path at an angle θ with the detection light path that is greater than zero for selecting the selected 3D volume of the 3D sample to be particularly excited by the 3D-confined illumination.

8. The apparatus of claim 1, wherein and the selected 3D volume of the 3D sample to be particularly excited by the 3D-confined illumination is selected using (i) a focused light beam shaping of the illumination light, and (ii) a 3D optical geometry of the light source adjusted to illuminate multiple sub-regions of the selected 3D volume of the 3D sample in a scan across an entirety of the selected 3D volume of the 3D sample during an exposure time.

9. The apparatus of claim 1, wherein the selected 3D volume of the 3D sample to be particularly excited by the 3D-confined illumination is selected by illuminating the 3D sample in a patterned or structured fashion resulting in a detected light field covering a desired 3D space of the 3D sample, the patterns or structures usable to enable computational reconstruction of final image data from the detected light fields.

10. The apparatus of claim 2, wherein (i) the illumination light changes photo-chemico-physical properties of one or more contrast agents in the 3D sample, rendering enhanced contrast in the selected 3D volume of the 3D sample to be particularly excited by the 3D-confined illumination, and (ii) an additional illumination light source and associated optical system to provide light field imaging of the contrast agents.

11. The apparatus of claim 2, wherein the optical system comprises a plurality of optical elements arranged to adjust the 3D optical geometry to create a plurality of detection light paths each at a respective angle with the illumination light path, and used for (i) selecting the selected 3D volume of the 3D sample to be particularly excited by the 3D-confined illumination, (ii) receiving the light field that propagates via the light detection light path from multiple views associated with the respective angles, and (iii) computational reconstruction of LFD imagery from the multiple views.

12. The apparatus of claim 11, wherein the apparatus comprises an endoscope.

13. The apparatus of claim 2, wherein the optical system comprises a plurality of optical elements arranged to adjust the 3D optical geometry to create a plurality of detection light paths each at a respective angle with the illumination light path, and used for (i) selecting the selected 3D volume of the 3D sample to be particularly excited by the 3D-confined illumination, (ii) receiving the light field that propagates via the light detection light path from multiple views associated with the respective angles, and (iii) computational reconstruction of LFD imagery from the multiple views.

14. The apparatus of claim 1, wherein the selected 3D volume of the 3D sample to be particularly excited by the 3D-confined illumination is selected by adjusting the optical system using (i) a single core fiber to emit the illumination light that propagates via the illumination light path to illuminate the 3D sample, or (ii) a multi-core fiber to emit the illumination light that propagates via the illumination light path to illuminate the 3D sample, or (iii) a combination of one or more of single core fibers and multi-core fibers to emit the illumination light that propagates via the illumination light path to illuminate the 3D sample.

15. The apparatus of claim 1, wherein the selected 3D volume of the 3D sample to be particularly excited by the 3D-confined illumination is selected by adjusting the optical system using (i) a single core fiber to receive the light field which comes from the illuminated 3D sample, or (ii) a multi-core fiber to receive the light field which comes from the illuminated 3D sample, or (iii) a combination of one or more of single core fibers and multi-core fibers to receive the light field which comes from the illuminated 3D sample.

16. The apparatus of claim 1, wherein the apparatus comprises an endoscope.

17. The apparatus of claim 1, wherein the selected 3D volume of the 3D sample to be particularly excited by the 3D-confined illumination is selected using non-linear multi-photon optical excitation and adjusting a 3D optical geometry of the light source in relation to the optical system.

18. The apparatus of claim 17, wherein the detection light path is collinear to the illumination light path.

19. The apparatus of claim 1, wherein the selected 3D volume of the 3D sample to be particularly excited by the 3D-confined illumination is selected using a direct light beam shaping of the illumination.

20. The apparatus of claim 1, comprising switchable optical components and optical geometries, the apparatus being an add-on module retrofitted to an already existing microscope, or being an integrated module of a designed-from-scratch microscope, with said microscope having multiple imaging capabilities, wherein the multiple imaging capabilities comprise performing high-resolution optical sectioning in 3D with resolution of up to 2 microns.

21. A volumetric imaging system comprising:
the apparatus of claim 1;
an LFD system comprising a camera including optics, the LDF system being arranged with respect to the apparatus to receive the light field, which comes from the illuminated 3D sample, and to capture LFD imagery projected by the light field;
a computer communicatively coupled with the apparatus and configured to generate volumetric imaging data of the 3D sample by performing a computational reconstruction of the LFD imagery.

* * * * *

UNITED STATES PATENT AND TRADEMARK OFFICE
CERTIFICATE OF CORRECTION

| | | |
|---|---|---|
| PATENT NO. | : 10,901,193 B2 | Page 1 of 1 |
| APPLICATION NO. | : 16/079979 | |
| DATED | : January 26, 2021 | |
| INVENTOR(S) | : Thai V. Truong et al. | |

It is certified that error appears in the above-identified patent and that said Letters Patent is hereby corrected as shown below:

In the Specification

Column 1, Line 15, insert:
--STATEMENT OF FEDERALLY SPONSORED RESEARCH
This invention was made with government support under R01 OD019037 awarded by the National Institutes of Health (NIH). The government has certain rights in the invention.--

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*